Figure 1:
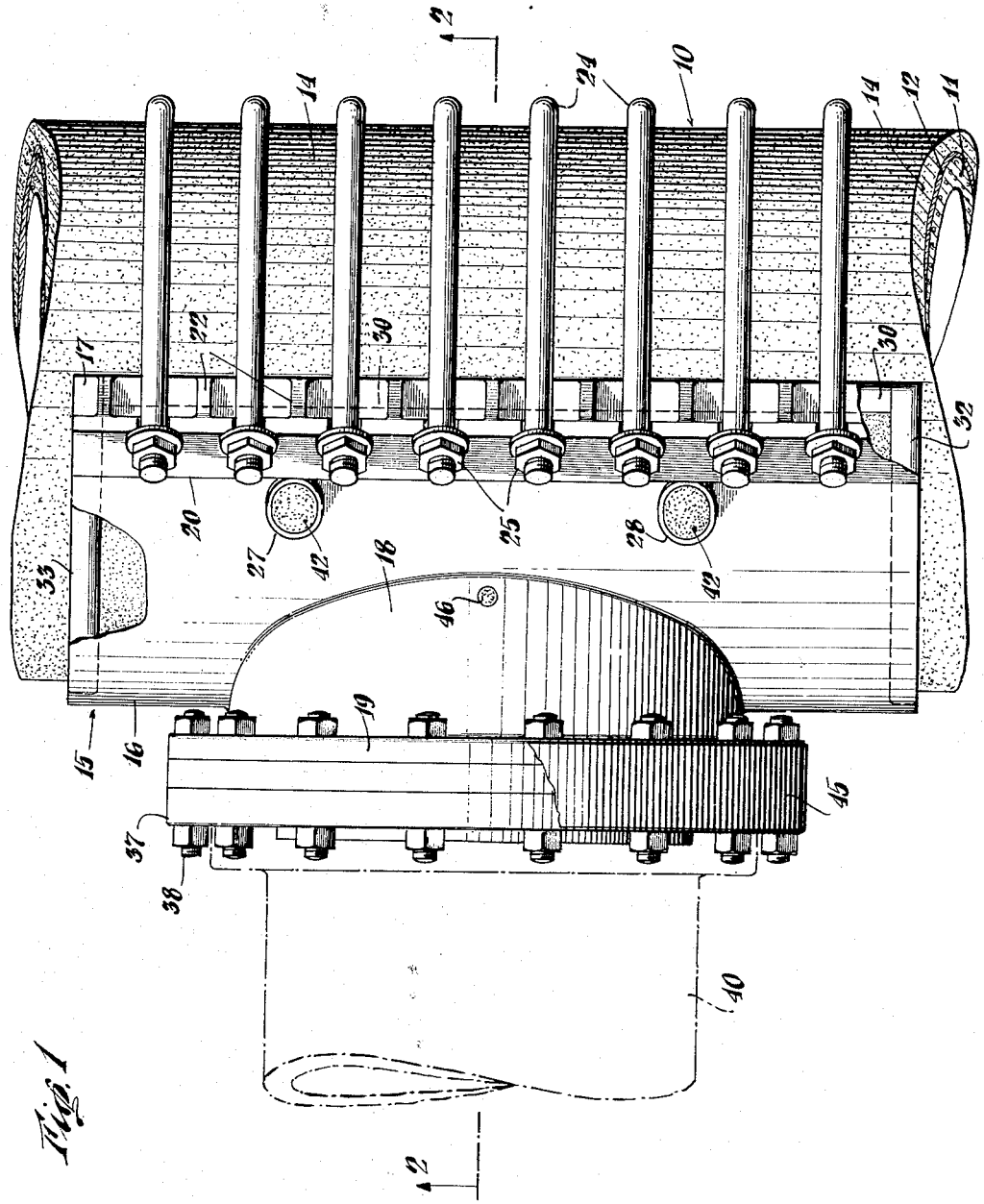

July 27, 1954     J. E. LONGLEY     2,684,859
SADDLE TYPE BRANCH PIPE CONNECTION
Filed March 31, 1950     2 Sheets-Sheet 1

INVENTOR.
James Edward Longley
BY
Robert S. Dunham
ATTORNEY

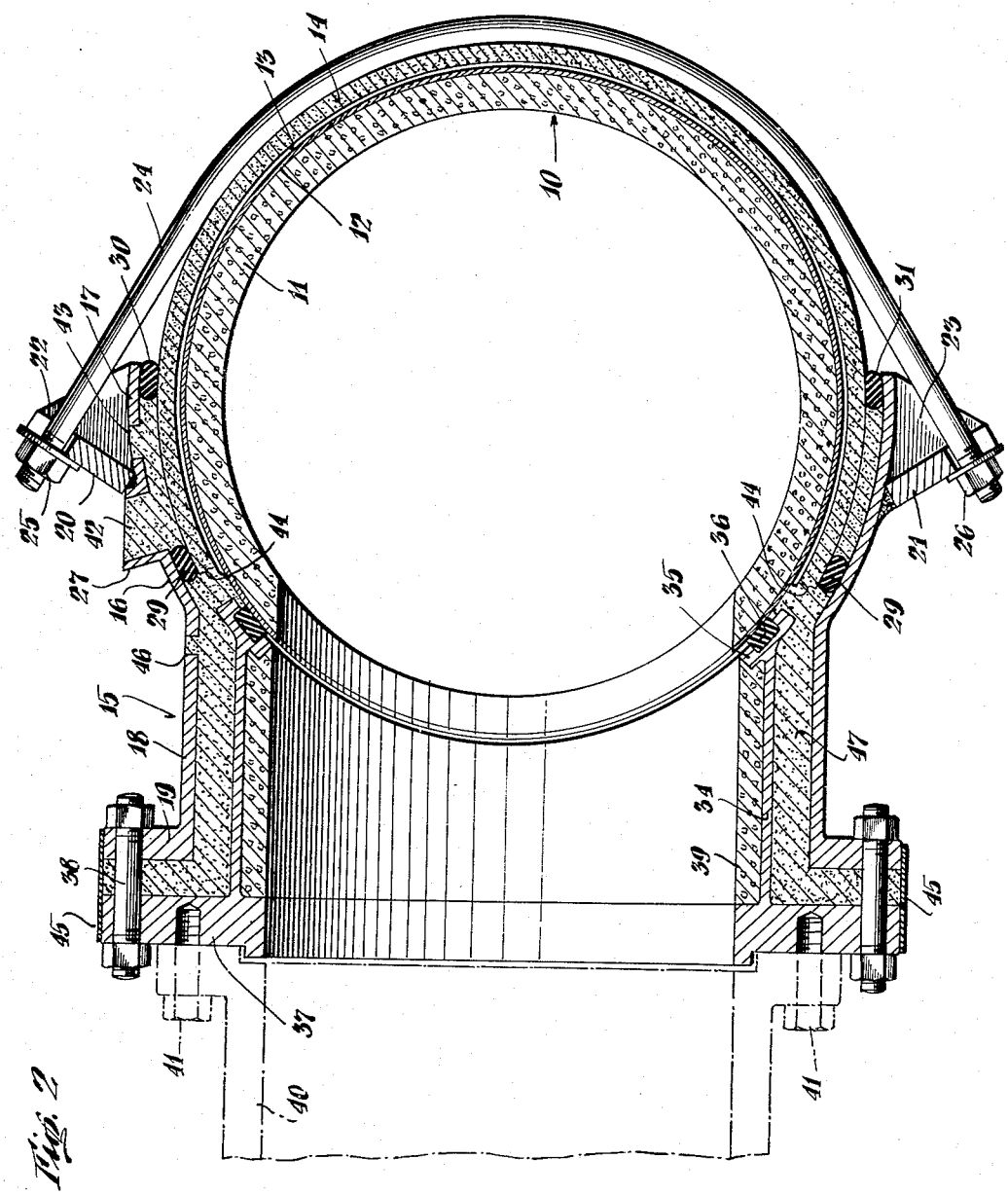

UNITED STATES PATENT OFFICE 2,684,859

SADDLE TYPE BRANCH PIPE CONNECTION

James Edward Longley, Verona, N. J., assignor to Lock Joint Pipe Company, East Orange, N. J., a corporation of New Jersey Application March 31, 1950, Serial No. 153,195

1 Claim. (Cl. 285—108)

This invention relates to an apparatus and method for making branch connections to a main pipe.

While the invention is adaptable for making a branch connection with metallic or other forms of pipes, it is particularly well suited for making a branch connection with a reinforced concrete pipe of the steel cylinder type. Such pipes ordinarily have a protective covering of concrete outside of the steel cylinder and embedding any reinforcement which may be present. A concrete exterior is unsuited for providing a sealed relationship for a branch connection, particularly when the pipe is employed for carrying fluid under high pressures.

The present invention provides for rigidly attaching a branch connection to a pipe, and a single seal between the branch connection and the pipe. The structure includes a saddle with a tubular portion extending therefrom and by which a gland and packing are held in sealing relationship with the pipe. Though initially adjustable, the gland is held in rigid relationship with the saddle when mounted in its ultimate position of use. This is accomplished by the assistance of a filling of hardened plastic material, such as mortar, between the gland and the tubular wall extending from the saddle. The branch connection is attached to the rigidly supported gland.

The inside surface of the saddle has a concave curvature approximating the curvature of the exterior of the pipe, and tensioned straps hold the saddle in place on the pipe. While the inside surface of the saddle may bear directly against the exterior of the pipe, it is preferable to so mount the saddle in place with a coextending layer of mortar or other hardened plastic material between the inside surface of the saddle and the exterior of the pipe when it is considered desirable to eliminate the possibility of corrosion occurring on the inside surface of the saddle. In the latter case, the inside surface of the saddle is initially supported clear from the exterior of the pipe and a cement mortar grout is applied to the space between the saddle and the exterior of the pipe. After the mortar between the saddle and the pipe has taken its initial set the saddle is tightened into firm engagement with the mortar. The saddle is immovably and rigidly held to the pipe.

The gland is tubular and is located centrally of the tubular wall of the annular opening in the saddle. The packing is compressed between the gland and the pipe by the tensioning of bolts between the saddle and the gland. After the packing has been subjected to fluid pressure and thoroughly tested, a cement mortar grout is placed in the annular space surrounding the gland and interiorly of the tubular wall of the saddle. When the apparatus is applied to a pipe of the steel cylinder type, the covering of concrete and any reinforcement embedded therein which overlies the cylindrical steel sleeve of the pipe is cut away within the area of the annular wall of the saddle-opening before the gland and the packing are placed in position. The packing is then compressed against the steel cylinder.

In the drawings,

Fig. 1 is a plan of the apparatus of the present invention attached to a main pipe; and Fig. 2 is a section on line 2—2 of Fig. 1.

For the purpose of explaining the invention a well known type of high pressure pipe such as is used in water distribution systems is illustrated in the drawings. The pipe 10 includes a lining of concrete 11, a cylindrical steel sleeve 12, a tension wire winding 13 which is helically wrapped around the steel sleeve, and a protective covering of concrete 14. The invention is suitable for use with other types of pipes.

The saddle 15 includes a portion 16 comprising a concave wall 17 having a curvature approximating the curvature of the exterior of the main pipe. The saddle is provided with a central annular opening defined by a cylindrical tubular wall 18 which connects with and extends from the concave wall 17 and terminates in a flange 19. The saddle has attached to it a pair of plates 20, 21, which are supported, respectively, from a plurality of brackets 22, 23. The plates 20 and 21 are engaged by the ends of a plurality of straps which are in the form of U-bolts having diverging ends. Their ends are threaded and engaged by nuts 25 and 26. When the straps 24 are tensioned, the saddle is drawn towards the main pipe 10.

The saddle is provided with one or more ports 27, 28, Fig. 1, through which cement mortar grout may be introduced to the space between the outside of the pipe and the inside of the saddle. This space is enclosed around its edges by resilient means comprising five rubber gaskets 29, 30, 31, 32 and 33. The gasket 29 is circular and lies at the junction of the cylindrical tubular wall 18 and the curved wall 17 of the saddle, Fig. 2. The gaskets 30 and 31 are located at opposite sides of the pipe and under the longitudinally extending edges of the saddle wall 17. The gaskets 32 and 33 are located at the curved ends of the saddle between the wall 17 and the pipe, Fig. 1. The gasket 29 constitutes a dam sealing the boundary of the space between the saddle and the pipe adjacent the tubular wall portion 18, and the gaskets 30, 31, 32 and 33 constitute a dam sealing the outer boundary of the same space.

The cement grout or other plastic material between the outside of the pipe and the saddle wall 17, when hardened, serves to protect the inside wall of the saddle. It is also provides a firm foundation for the saddle and branch connection, but, if desired, it can be dispensed with and the saddle clamped in contact with the pipe.

The gland 34 is provided with a grooved ring member 35 at its inner end in which a sealing means, such as rubber gasket or other packing 36, is fitted. The gland 34 is tubular and carries at its remote or other end a flange 37 which is disposed parallel to the flange 19 of the tubular wall 18 of the saddle. The gland is mounted in place within the wall 18 by a plurality of bolts 38 which are tensioned between the flanges 19 and 37. By tensioning these bolts, the packing 36 is firmly compressed against the pipe.

The tubular gland 34 is of less diameter than the cylindrical wall 18, and the space between the gland and the wall and between the two flanges 19 and 37 is filled with cement mortar grout after the bolts 38 have been tightened and the sealing quality of the packing 36 has been tested. The gland 34 is lined with concrete to provide a protective inner surface, but if the wall of the gland is sufficiently thick the concrete lining 39 may be omitted. The branch connection 40, which may constitute a valve or a section of pipe, is secured to the flange 37 of the gland by a plurality of machine screws 41.

The manner of applying the apparatus and of making the branch connection will now be described. The saddle is mounted in place against the pipe at a location where a branch connection is desired, and the nuts 25 and 26 at the ends of the straps 24 are adjusted only enough to hold the saddle in place. The gaskets 29, 30, 31, 32 and 33 are then tucked in place between the curved wall 17 of the saddle and the outside of the pipe so as to enclose a space for receiving cement mortar 42, and the saddle is lightly set against the gaskets. Cement mortar grout is then poured through the ports 27 and 28 and into the sealed space underlying the curved portion of the saddle. The hole 43 permits the escape of air from the enclosed space. The straps 24 are additionally tensioned for compacting the filling and for forcing out the excess of cement mortar grout.

The concrete covering 14 is chipped out approximately even with the edge of the annular opening in the saddle, as shown at 44, Fig. 2. After the mortar between the inside of the saddle and the pipe has taken its initial set, the saddle is snugly tightened against the mortar by further tensioning of the straps 24. The circumferential wire reinforcing 13 is cut away adjacent to the edge 44 of the concrete covering.

The gland 34 and a packing or gasket 36 are then inserted within the tubular wall portion 18 of the saddle and the gasket is compressed to provide a water-tight seal against the steel cylinder 12 by tensioning the bolts 38. The gasket is then tested for water-tightness after a plate (not shown) has been secured to the flange 37 of the gland.

After testing is completed, and the bolts 38 have been given their final tension, a strip of paper or of light metal 45 is placed around the edges of the flanges 19 and 37 and the space between the flanges and between the exterior of the gland 34 and the interior of the tubular wall 18 is filled with cement mortar grout. The hole 46 enables the bleeding of any air from the enclosed space in order to assure that the space is filled with mortar 47. The solid body of mortar around the gland and between the flanges enhances the rigidity of the attached saddle and gland. The mortar locks the gland in place owing to its irregular configuration in the region of the saddle wall 17 and outside of gland ring member 35. The inside surface of the tubular wall 18 of the saddle may be roughened to increase the locking effect of the mortar between the saddle and the gland.

The flange of a tapping valve 40 is attached to the flange 37 of the gland by means of the screws 41. A tapping machine of conventional type is bolted to the other side of the tapping valve. When the cut is to be made the cutter of the tapping machine is rotated and advanced through the tapping valve to cut a hole of desired size through the cylinder and the concrete core, or other remaining portion of the pipe. After the cut has been completed, the cutter is withdrawn through the tapping valve, the tapping valve is closed and the tapping machine is removed. The tapping valve remains a part of the completed connection This invention is capable of numerous forms and various applications without departing from the essential features herein disclosed. It is therefore intended and desired that the specific description herein be deemd illustrative and not restrictive and that the patent shall cover all patentable novelty herein set forth; reference being had to the following claim rather than to the particular showing herein to indicate the scope of this invention.

What is claimed is:

Apparatus for making a branch connection with a pipe, comprising a saddle base having a concave surface with a curvature substantially paralleling the curvature of the outer surface of said pipe, means for attaching said saddle base to said pipe, a tubular neck projecting from said base oppositely from the location of the center of curvature of said concave surface, said neck having a central bore and carrying a flange extending radially outwardly from the free end of said neck, a tubular gland disposed inside of said bore and extending beyond the free end of said neck, said tubular gland having a peripheral wall surface facing said bore and spaced sufficiently therefrom for defining therewith an annular space for receiving cementitious material, said tubular gland having a grooved ring member at one end and carrying a radially outwardly extending flange at its other end, said ring member having a shoulder extending radially outwardly beyond said peripheral wall surface of said tubular gland, a gasket contained in the groove of said ring member for sealing against a surface of the pipe, and means rigidly securing said tubular gland to said neck, said securing means comprising bolts connecting between said flanges and a solid annular body of hardened cementitious material moulded in situ in said annular space in contact with said bore and said tubular gland and engaged by said flanges and said shoulder of said ring member whereby said tubular gland and said body of cementitious material are interlocked together and with said saddle base.

References Cited in the file of this patent

UNITED STATES PATENTS

| Number | Name | Date |
|---|---|---|
| 873,689 | Van Winkle | Dec. 10, 1907 |
| 1,178,234 | Hayden | Apr. 4, 1916 |
| 2,050,985 | Trickey | Aug. 11, 1936 |

FOREIGN PATENTS

| Number | Country | Date |
|---|---|---|
| 337,866 | Germany | June 9, 1921 |